United States Patent
Snow et al.

[15] 3,688,963
[45] Sept. 5, 1972

[54] INDEXING MEANS AND CONVEYORS FOR USE THEREWITH

[72] Inventors: Gerald A. Snow, 5 Pine Ridge Road, Cumberland Foreside, Maine 04092; Harold A. Doughty, Eastman Road, Cape Elizabeth, Maine 04107; Charles E. Allard, 12 Forest Ave., Old Orchard Beach, Maine 04064; Charles B. Noonan, R.F.D. 1, Hollis Center, Maine 04042

[22] Filed: Aug. 19, 1970

[21] Appl. No.: 64,979

[52] U.S. Cl. .................................. 226/162, 226/172
[51] Int. Cl. ............................................ B65h 17/26
[58] Field of Search ...... 198/135, 203; 226/162, 170, 226/171, 172

[56] References Cited

UNITED STATES PATENTS

| | | | |
|---|---|---|---|
| 2,908,378 | 10/1959 | Brown et al. | 198/135 |
| 2,586,630 | 2/1952 | Erland et al. | 198/203 |
| 2,720,963 | 10/1955 | Stanley et al. | 198/135 |
| 3,310,849 | 3/1967 | Hazelett et al. | 226/172 X |
| 2,943,726 | 7/1960 | Granath | 198/135 |
| 3,006,520 | 10/1961 | House | 226/170 X |
| 3,429,493 | 2/1969 | Lehmann | 226/162 X |
| 3,082,859 | 3/1963 | Hagner et al. | 198/135 |
| 3,420,037 | 1/1969 | Villemure et al. | 198/135 X |

*Primary Examiner*—Allen N. Knowles
*Attorney*—Abbott Spear

[57] ABSTRACT

Indexing means are disclosed that have a support reciprocable by power operated means lengthwise of a conveyor between two limits and provided with conveyor grabbing means. Means are also provided to lock the conveyor against movement during dwells. Control means provide that on movement of the support in one direction the grabbing means are operated to cause the conveyor to be pulled thereby to complete a step and then to render the locking means operative for a predetermined interval during which the support is returned for another step. The travel of the support is adjustable and is controlled to provide for its acceleration and deceleration at the beginning and end of each step. The conveyor is shown as including both hold-down and supporting conveyors, each including two transversely spaced pairs of endless chains with the chain grabbing means including devices at each side of the conveyor, each receiving the outer chains of the proximate courses and operable to clamp them together. The proximate course of the inner chains of the hold-down conveyor are yieldably urged into material gripping relationship with the corresponding chains of the proximate course of the supporting conveyor.

21 Claims, 20 Drawing Figures

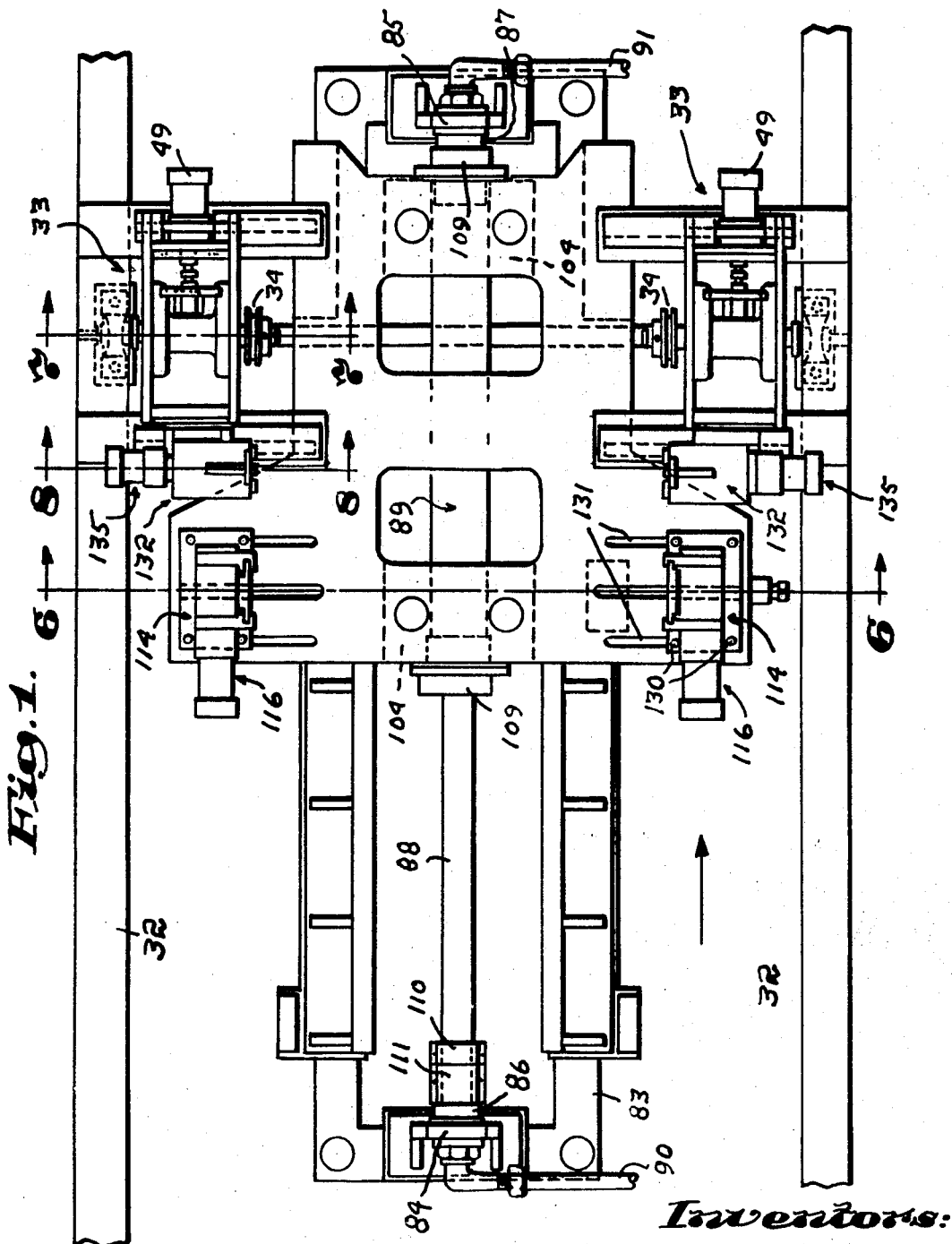

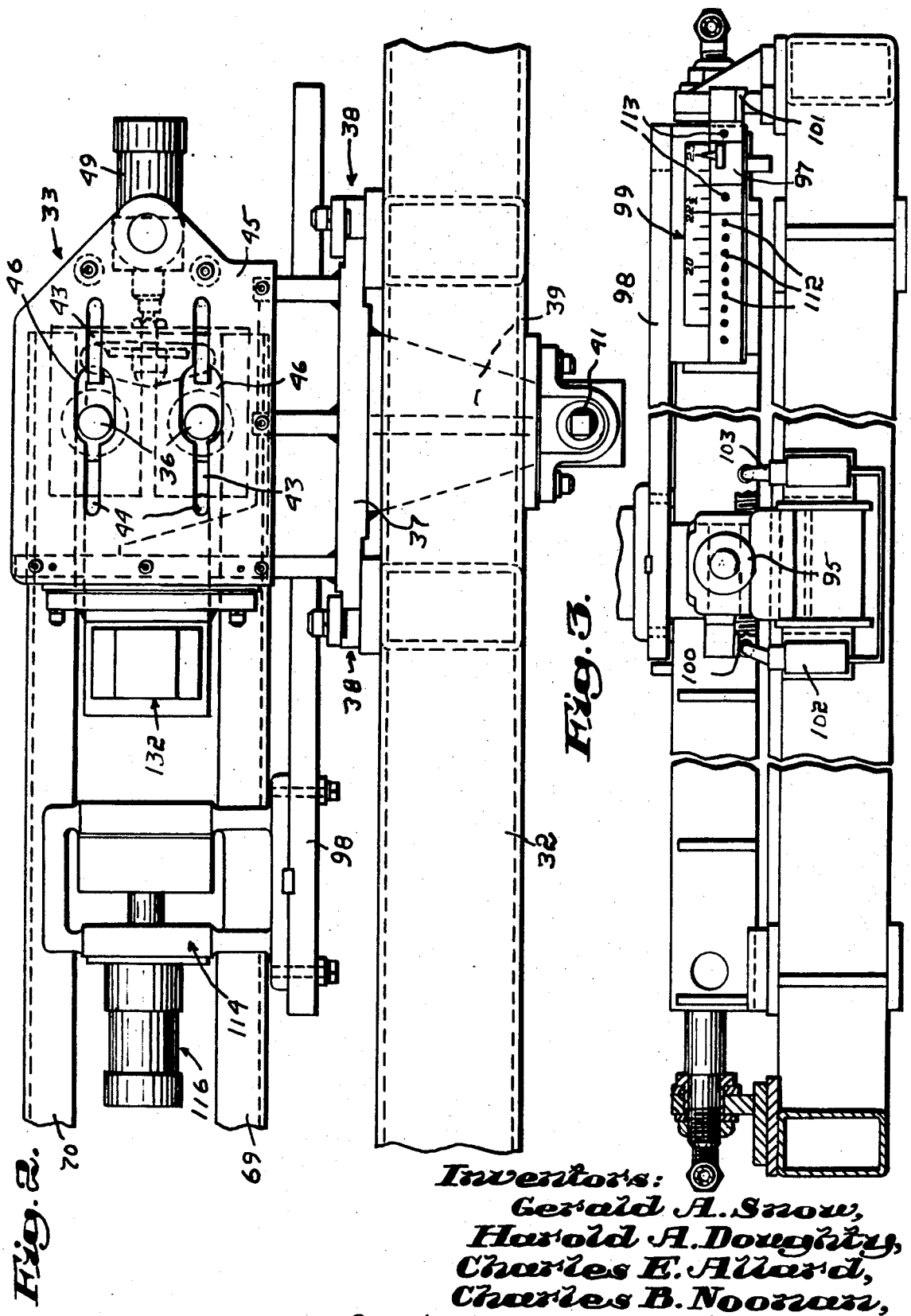

Inventors:
Gerald A. Snow,
Harold A. Doughty,
Charles E. Allard,
Charles B. Noonan,
by A.H.Spencer,
Attorney

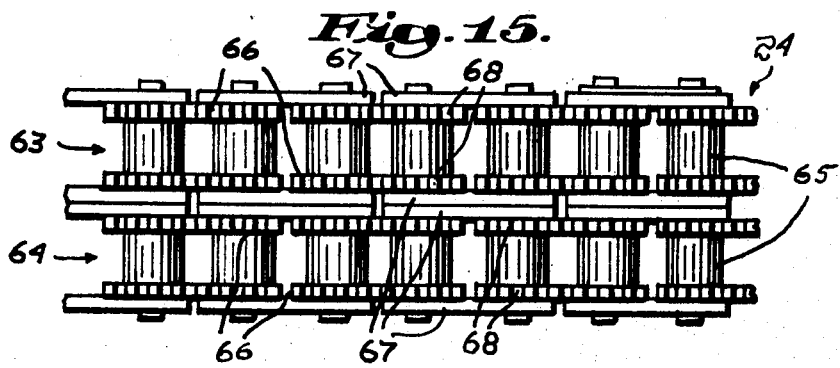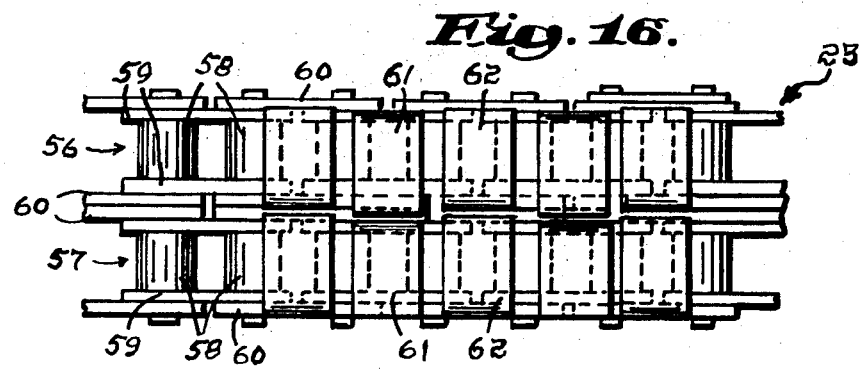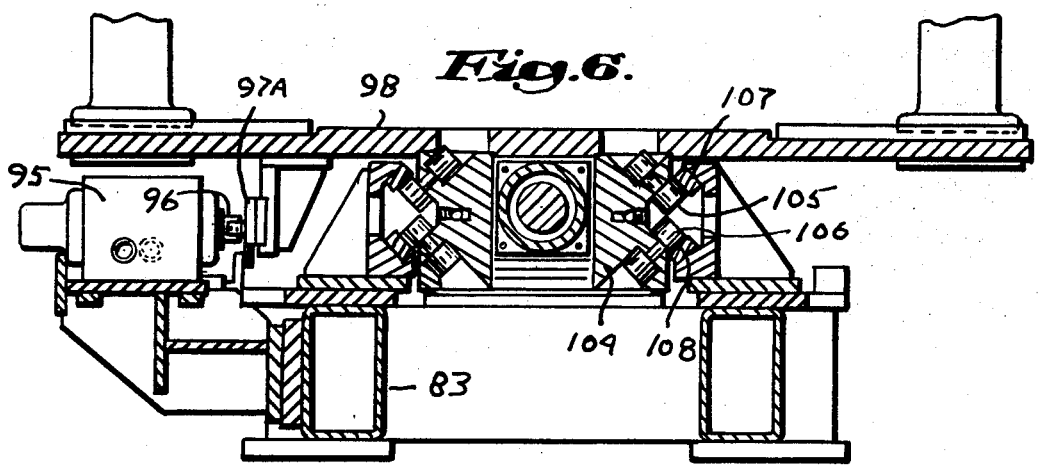

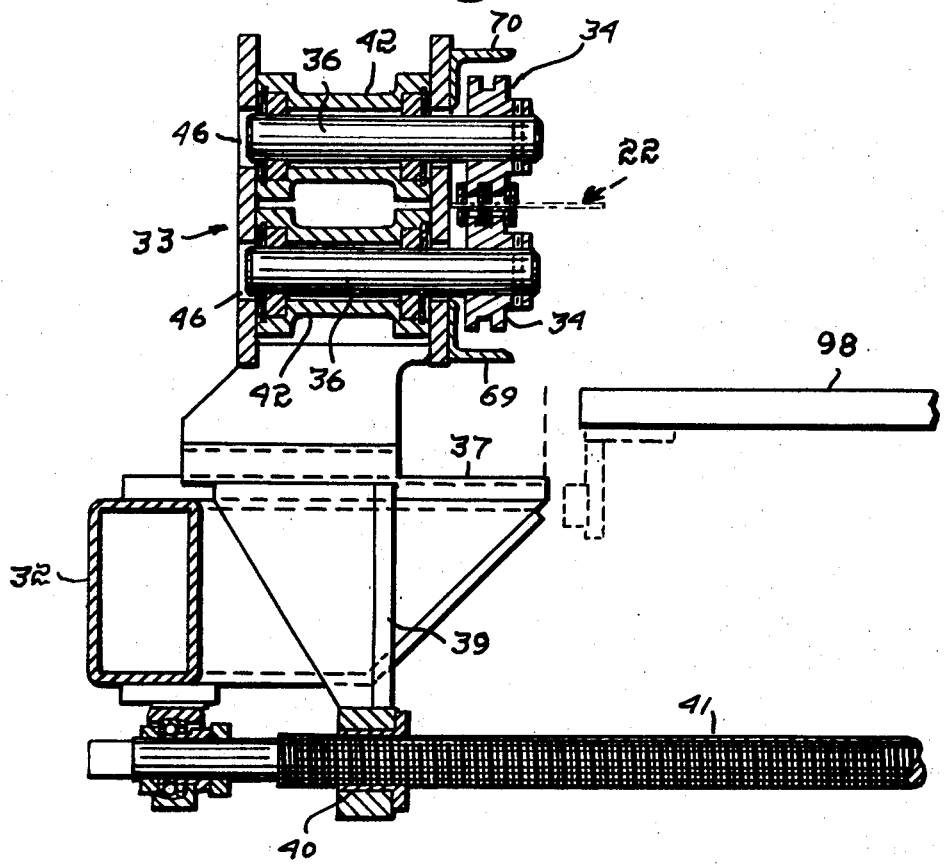
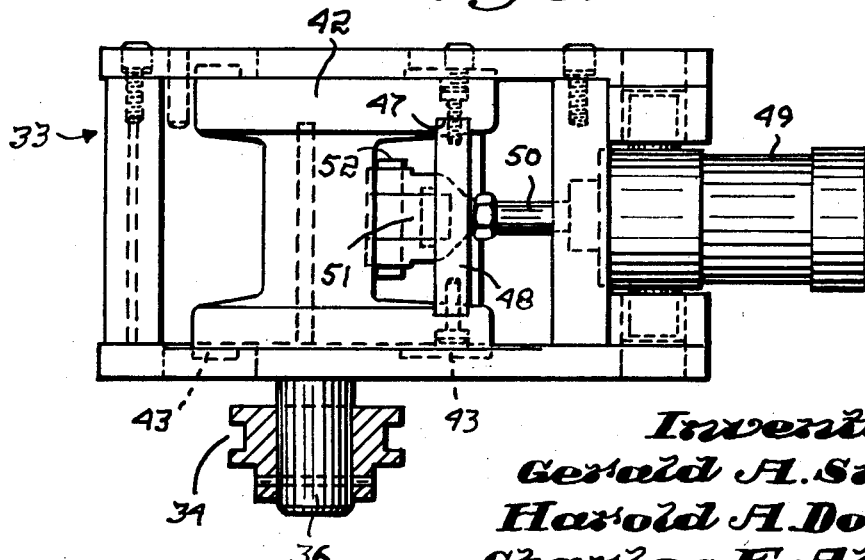

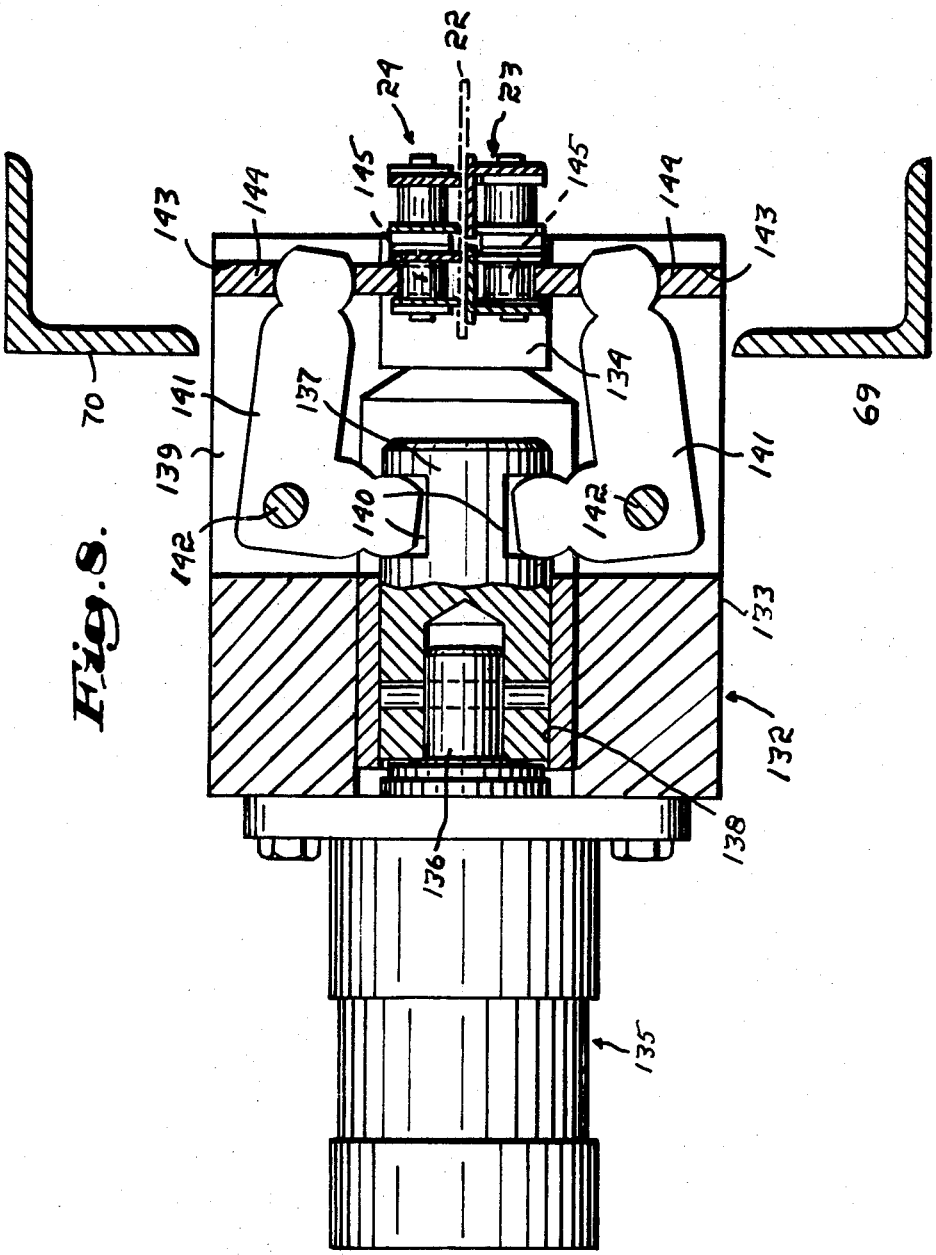

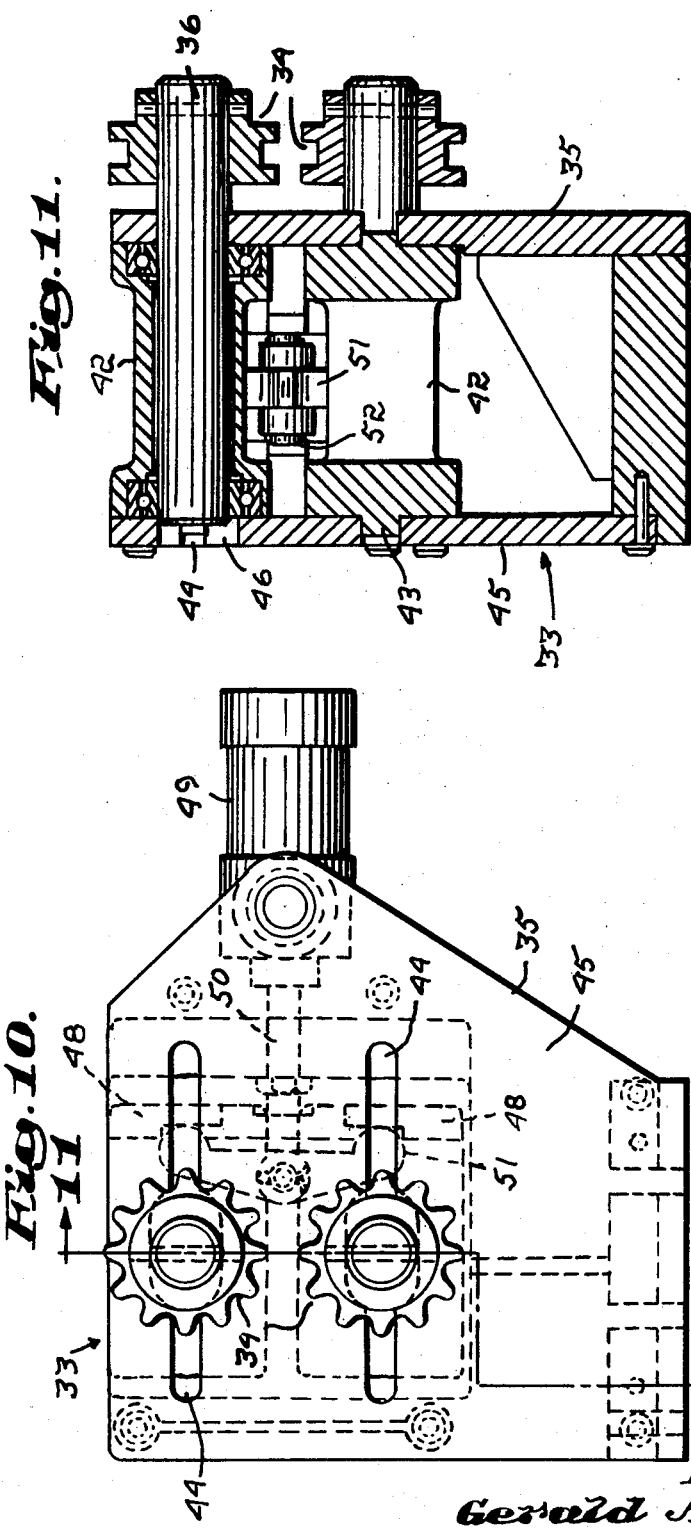

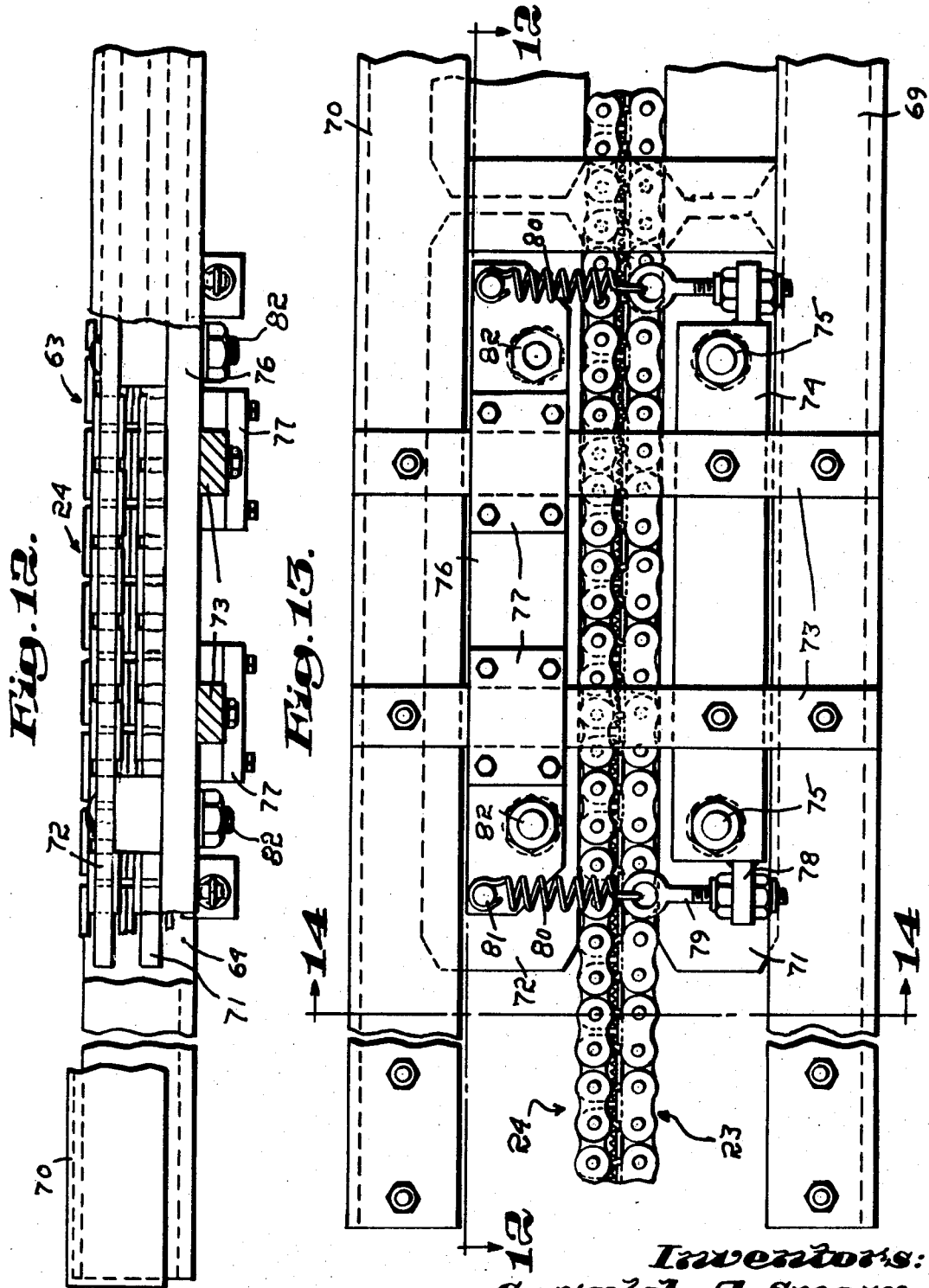

Inventors:
Gerald A. Snow,
Harold A. Doughty,
Charles E. Allard,
Charles B. Noonan,
by A. Whitman
Attorney

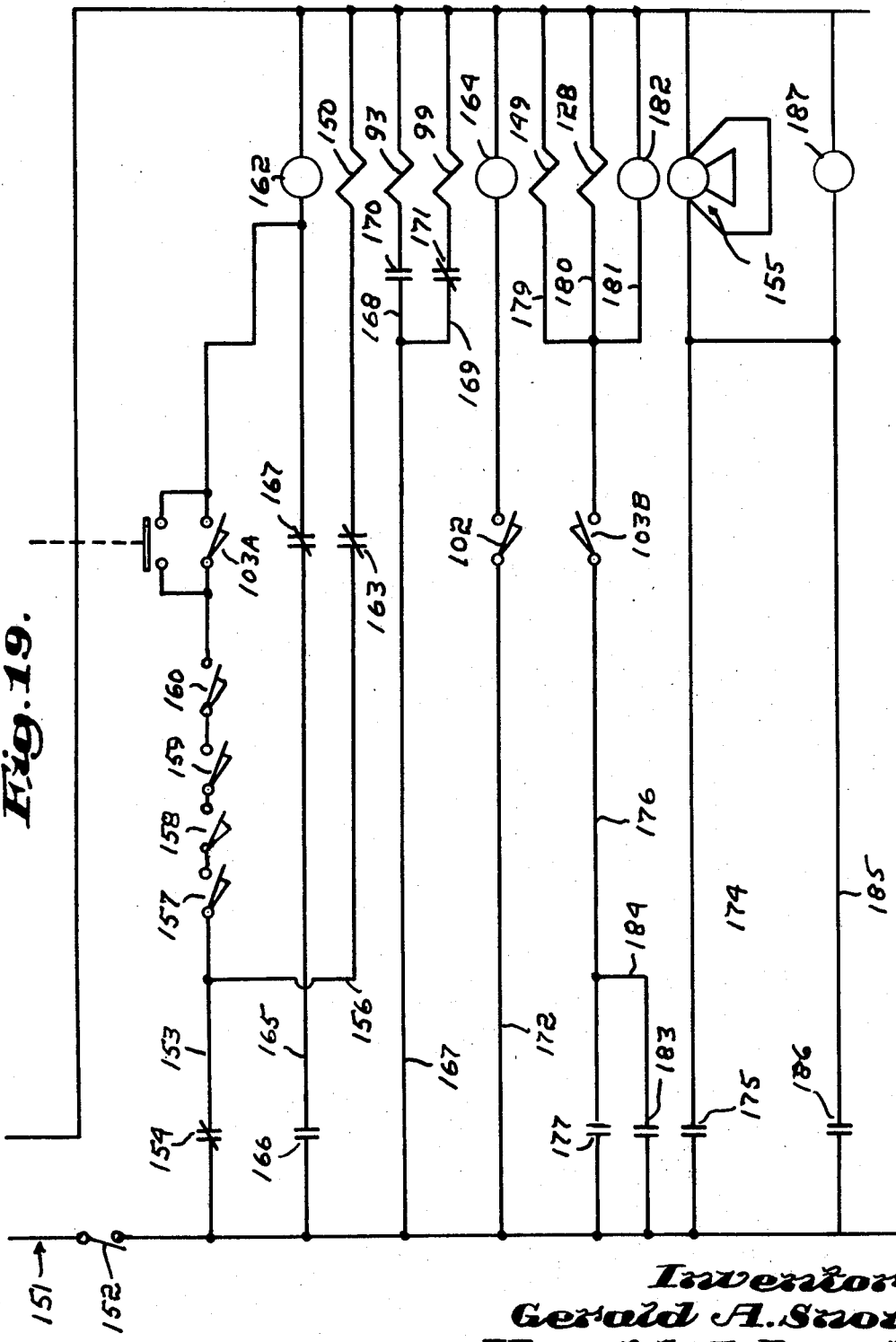

INDEXING MEANS AND CONVEYORS FOR USE THEREWITH

The present invention relates to conveyor indexing means and conveyors for use therewith.

In the production of many articles, it is necessary to effect their advance step-by-step in order that successive operations can be performed thereon during dwells. Where these operations require that the articles be exactly positioned, indexing presents problems.

By way of example, the production of molded articles from plastic sheet material requires a conveyor to advance a sheet through a heating station to a forming station where it is subjected to the action of coacting, article-forming molds and finally, after the sheet and the articles formed therein have become sufficiently cooled to avoid warping, to a blanking station where the articles are die-cut therefrom. For production purposes, the article forming and blanking stations are spaced apart by a distance representing a number of steps making it possible to provide an intermediate station for additional operations such, for example, as printing. In practice, it is necessary to use, for this type of production, supporting and hold-down conveyors to prevent warping. Such conveyors comprise transversely spaced, endless chains.

In U.S. Pat. No. 3,504,074, of Mar. 31, 1970, apparatus of the above summarized type is disclosed that has successfully met the requirements of volume production of containers of which egg cartons are but one example. In that patent, the shafts for the sprockets about which were trained corresponding ends of the chains of the two conveyors are gear-connected and the indexing means are operative to turn a disc fast on one of those shafts. This arrangement did not permit the step length to be varied and lead to the indexing means disclosed in application Ser. No. 13,631, filed Feb. 24, 1970, owned by applicants' assignee and operating in a generally similar manner but permitting of adjustments of the step length.

While the above referred to indexing means have successfully met production requirements, they have not entirely eliminated the possibility of small errors in step length which, because of the number of steps required, lead occasionally to printing, blanking, or both operations being inaccurately performed. Some articles, including several types of egg cartons, for example, can tolerate small stepping errors in their production while others, those, for example, having closely fitting covers, must be held to tolerances closer than have hitherto been possible to establish and maintain. The failure of the above referred to indexing means to be precisely uniform is due to several factors such as play between the sprockets and chains and chain stretching either due to temperature changes or to the repeated pull of the indexing means.

The general objective of the present invention is, accordingly, to provide indexing means for conveyors that enable accurate steps to be established and maintained, an objective attained by providing indexing apparatus having a base provided with a support reciprocable between two limits and provided with chain grabbing means. Means are provided to reciprocate the support between the two limits to effect predetermined travel of the grabbing means lengthwise of the conveyor and to render the grabbing means effective only during travel thereof from one limit to the other in one direction thus to positively effect a stepped advance of the conveyor that is accurately measured. The base is provided with means to lock the conveyor against movement for a predetermined dwell during which the support is returned into position for the next step.

Another objective of the present invention is to provide means that will ensure that the conveyor is subject to a constant endwise tension by fluid pressure operated means and when both supporting and hold-down conveyors are used, to ensure that both are equally tensioned.

Another objective of the invention is to provide apparatus in which the travel of the support for the grabbing means is accelerated at the commencement of each step and a retarded rate at the end thereof to minimize chain stretching and jamming.

And yet another objective of the invention is to provide that the conveying means include an additional chain trained about sprockets coaxial with the sprockets in support of the chains of the conveyor with the grabbing means including at least one tooth engageable therewith to ensure a positive hold. In practice, the grabbing means include two devices, one at each side of the conveying means and the conveying means includes an additional chain at each side, the additional chains being on the outside. When the conveying means includes both hold-down and supporting conveyors, each conveyor has such additional chains and each grabbing device clamps together the proximate course thereof at its side. Preferably means are employed to yieldably urge the proximate courses of the other chains together to ensure the effective gripping of the margins of the sheet material to ensure its advance and to hold it against warping as in the case of a heated plastic sheet.

In the accompanying drawings, there is shown an embodiment of the invention illustrative of these and other of its objectives, novel features, and advantages.

In the drawings:

FIG. 1 is a plan view of the indexing station of apparatus for advancing material step-by-step through a series of stations at which, during dwells, operations are performed thereon;

FIG. 2 is a side view of the reciprocable support and the chain tensioning means;

FIG. 3 is a side view of the indexing station broken away to foreshorten the drawing and with parts of the reciprocable support also broken away;

FIG. 6 is a section taken approximately along the indicated lines 6—6 of FIG. 1;

FIG. 7 is a section taken approximately along the indicated lines 7—7 of FIG. 1;

FIG. 8 is a section, on a further increase in scale, taken approximately along the indicated lines 8—8 of FIG. 1;

FIG. 9 is a plan view of one of the chain tensioning devices;

FIG. 10 is a side view thereof;

FIG. 11 is a section taken approximately along the indicated lines 11—11 of FIG. 10;

FIG. 13 is a side view thereof;

FIG. 15 is a plan view of the upper course of one of the pairs of chains of the hold-down conveyor;

FIG. 16 is a plan view of the upper course of one of the pairs of chains of the supporting conveyor;

FIG. 17 is a schematic view of the pneumatic circuitry in control of the grabbing devices;

FIG. 19 is a fragmentary schematic view showing that part of the electric circuitry concerned with indexing.

As the indexing means of the present invention may be illustrated without detailing stations to which articles are to be successively conveyed by the step-by-step operations of the conveyor means, a complete apparatus is not shown. The description of all features of the indexing means and of the preferred conveying means makes it convenient, however, to make reference to article forming and blanking stations indicated generally at 20 and 21, respectively, in FIGS. 18 and 18A with the conveyed material being a heated plastic sheet generally indicated at 22 in certain of the drawings, and with the conveying means comprising supporting and hold-down conveyors generally indicated at 23 and 24, respectively, which grip the margins of the sheet material 22 between them as it is conveyed to and through the article forming station 20 and thereafter, at least until it has sufficiently cooled to avoid warpage of the articles when blanked therefrom. The indexing station is generally indicated at 25.

Figure 18:
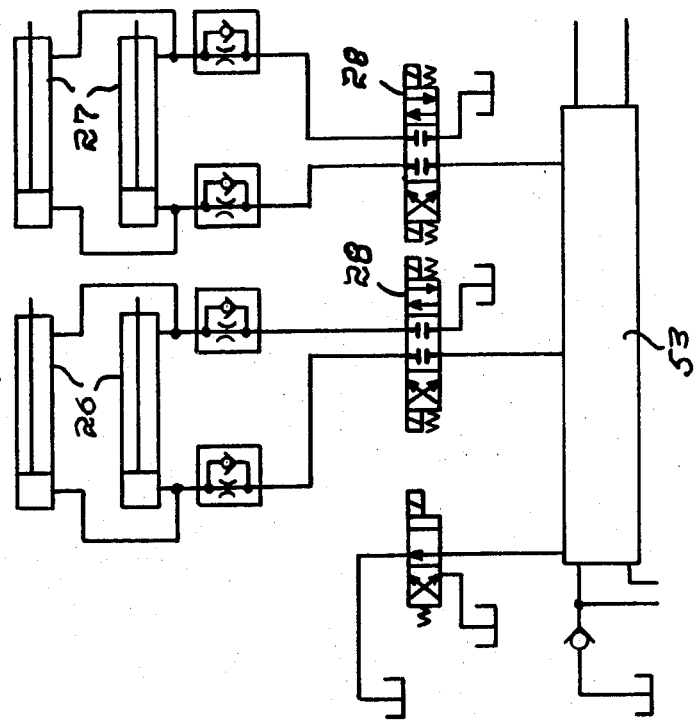
FIGS. 18 and 18A are schematic views of the hydraulic circuitry.
Figure 12:
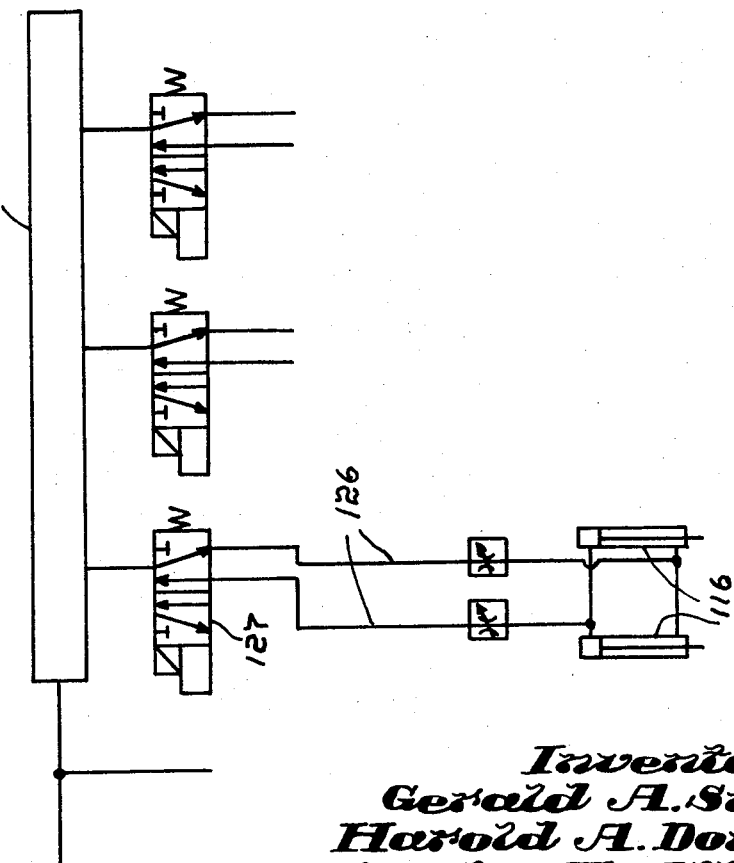
FIG. 12 is a plan view of one of the sections of the apparatus in which the lower course of the hold-down conveyor is yieldably urged against the upper course of the supporting conveyor.
Figure 18A:
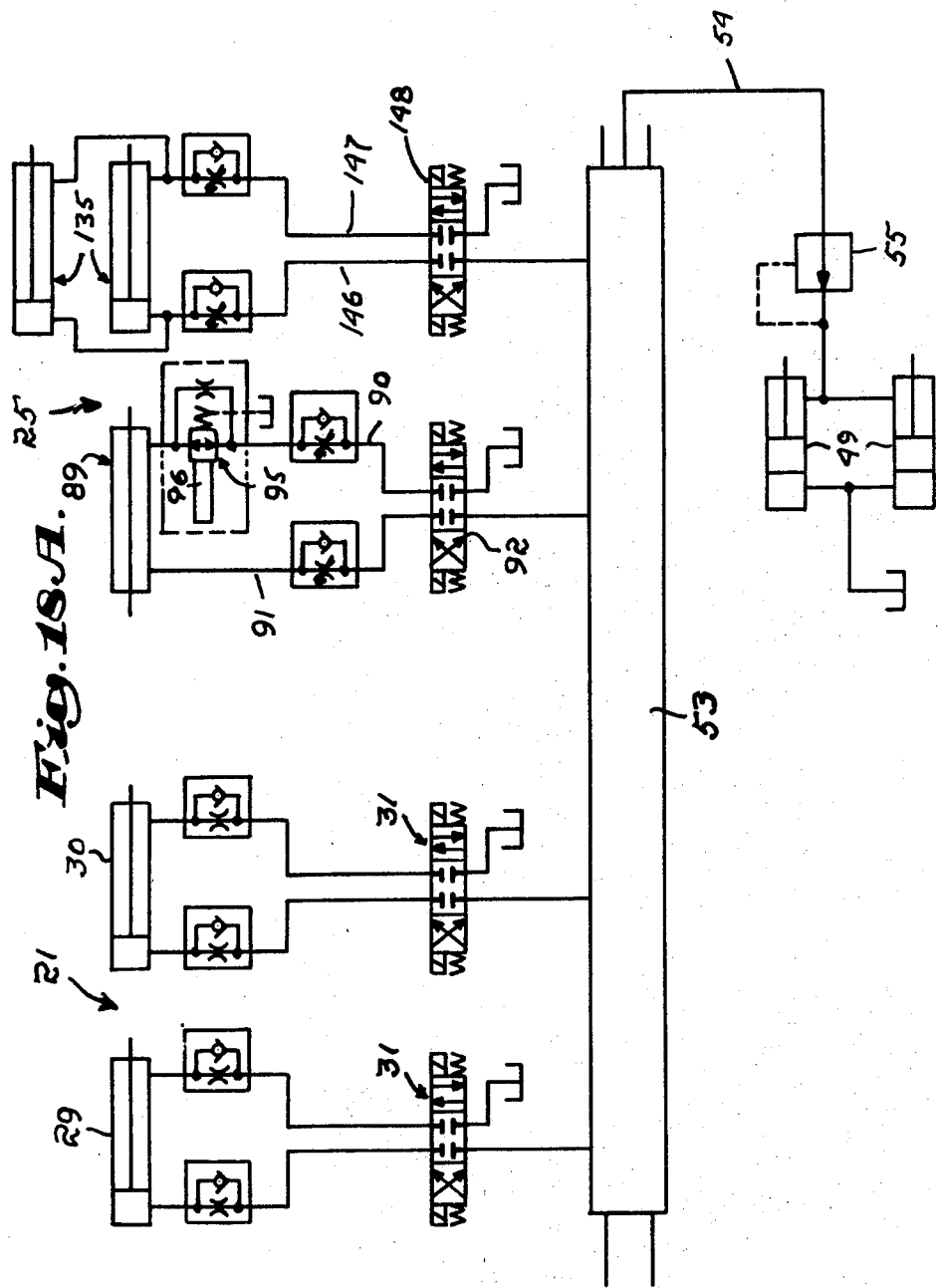

The article forming station 20 is shown schematically in FIG. 18 as having a lower and upper pair of hydraulically operated piston-cylinder units indicated at 26 and 27, respectively, operable to bring molds into and out of article-forming contact with opposite faces of the sheet material during a dwell. The operation of the units 26 and 27 is controlled by solenoid operated valves 28.

The sheet material 20 is then advanced step-by-step until it is sufficiently cool to permit the articles to be blanked therefrom at the blanking station 21, shown as having an upper hydraulically operated, piston-cylinder unit 29 and a lower like unit 30 for blanking dies operable to blank the formed articles from the sheet positioned between them at a dwell. The units 29 and 30 have their operation controlled by solenoid operated valves 31.

Intermediate stations such as printing station are omitted both to simplify the drawings and because intermediate operations are not always performed on the articles. As the circuitry for controlling the solenoids of the valves 28 and 31 form no part of the present invention, it is not shown.

The apparatus has a base common to the several stations of which its upper sides 32 are provided with supports, generally indicated at 33, for vertically spaced double sprockets 34 about appropriate ones of which the chains of the supporting and hold-down conveyors are trained. For convenience, only the sprocket supports 33 for the outfeed ends of the conveyors are shown and these are detailed in FIGS. 7, 9, 10, and 11.

Each sprocket support 33 includes a housing 35 in which vertically spaced shafts 36 are rotatably mounted, each shaft provided with a double sprocket 34. Each housing 35 has a base plate 37, see FIGS. 2 and 7, slidable in a transverse slideway 38 mounted on the subjacent rail 32 and each plate 37 has a depending arm 39 provided with a nut 40 through which is threaded one end portion of a shaft 41 extending transversely of the base below the side 32 and rotatably supported thereby. The nuts and threaded shaft portions at one side of the conveyor are of a hand opposite to those at the other side of the conveyor so that by turning the shaft 41 in one direction or the other, the spacing between the two sprocket supports 33 may be adjusted as required by the width of the sheet material 22 being processed. The supports 33 at the infeed ends of the conveyor are similar, as thus far described, and hence are not shown.

The supports 33 at the outfeed end of the apparatus have each of their shafts 36 supported by slides 42 each including end key portions 43 slidably entrant of slideways 44 in the side walls 45 of the housings 35 with the slideways provided with central, elongated portions 46 permitting sliding movement of the shafts 36. Each slide 42 has a vertical slot 47 by which bearing plates 48 are secured in vertically spaced relationship. Each support 33 at the outfeed end of the conveyor has a piston-cylinder unit 49 attached thereto with its stem 50 extending between the plates 48 and having a pressure member 51 centrally pivoted thereto as at 52. The piston-cylinder unit 49 is connected, see FIG. 18A, to one of the hydraulic pressure sources 53 by a conduit 54 provided with an adjustable valve 55. With such means, a desired chain-tensioning pressure is maintained on the chains of both conveyors and the centrally pivoted pressure member 51 is operative to equalize such pressures.

The conveyors 23 and 24 are best seen in FIGS. 12 – 16. The supporting conveyor 23 has a transversely spaced pair of roller chains, the inner chains being indicated at 56 and the outer pair of chains at 57. Each chain of the conveyor 23 has rollers 58 interconnected by inner links 59 and outer links 60. The inner links 59 at the inside of the chains and the outer links 60 at the outside of the chains have inturned flanges providing seats 61 and 62, respectively, along the upper surface of their upper course in support of the sheet material 22.

The hold-down conveyor 24 also has transversely spaced pairs of roller chains with the inner chains indicated at 63 and the outer chains at 64. Each chain of the conveyor 24 has rollers 65 interconnected by inner links 66 and outer links 67. Both sets of inner links 66 of each of the chains 63 and 64 have projecting teeth 68 disposed to be downwardly disposed in their lower courses thus to provide means for positively gripping the margins of the sheet 22 against the supporting surface provided by the seats 61 and 62 of the chains of the conveyor 23.

The remote courses of the chains of the conveyors 23 and 24 are protected by shields 69 and 70, respectively, secured at their ends to the sprocket supports 33 and these serve as a means for mounting shoes 71 and 72 ensuring that the proximate courses of the inner chains of the conveyors 23 and 24 are held in a sheet gripping relationship. In practice the inner shoes 71 and the shoes 72 are spaced along the full length of the conveyors except in the zone of the locking means. As may be seen in subsequently to be described FIGS. 12 – 14, the shields 69 and 70 are interconnected by pairs of vertical members 73 to the inner face of each pair of which a lower bar 74 is secured. Each bar 74 has a pair of inwardly disposed bolts 75 supporting a pair of shoes 71 spaced from each other and dimensioned so that each supports a chain of the conveyor 23 by the rollers thereof. An upper bar 76 is slidably supported on the inner faces of the members 73 by keepers 77. At each end of each lower bar 74 there are supports 78 for eyes 79 to which the lower ends of tension springs 80 are attached. The upper ends of the springs 80 are secured by pins 81 to the upper bar 74 which has bolts 82 supporting a single shoe 72 dimensioned to ride on the rollers of the inner chains 63 of the upper or hold-down conveyor 24 with the springs 80 ensuring the effective gripping of the margins of the sheet material 22 between the two conveyors. The outer chains 64 of the conveyor 24 are not held down.

In FIG. 1 the base is shown as having an inner frame 83 provided with end mounts 84 and 85 including seats 86 and 87, respectively. The ends of a tubular stem 88 of a piston-cylinder unit 89 are secured by the mounts 84 and 85. The piston-cylinder unit 89 is of the double-acting type and each end of the stem 88 has a conduit secured thereto, the conduit 90 for effecting forward indexing of the conveyors and the conduit 91 for effecting the reset position of the indexing means. The conduits 90 and 91 are connected to one of the sources 53 of liquid under pressure by a four-way valve 92 set in an indexing position by the solenoid 93 and in a resetting position by the solenoid 94, see FIG. 19.

In addition, the conduit 90 is provided with a valve 95 mounted on the frame 83 and having its stem 96, see FIG. 6, actuated by a cam 97 mounted on one side of a support 98 for adjustment relative to the fixed scale 99, see FIG. 3. That side of the support 98 is also provided with cams 100 and 101 arranged to operate limit switches 102 and 103, respectively, also mounted on the frame 83. The cam 101 is secured to the cam 97 so that it is adjusted therewith.

The support 98 is connected to the cylinder of the unit 95 by carriages 104. Each carriage 104 has upper side rollers 105 whose axes are outwardly and downwardly inclined and lower side rollers 106 whose axes are outwardly and upwardly inclined. Vertically connected tracks 107 and 108 at each side of the carriage are supported by the frame 83 and are disposed at the appropriate angle for engagement by the appropriate rollers of the carriages thus ensuring free travel of the support 98 between the seats 86 and 87, the distance between which defining the maximum step length. The carriages 104 have contact heads 109 for engagement with an appropriate one of the seats. The step length may be varied as by means of stops detachably mounted on the stem 88 to be engaged by and limit travel of the carriage 98 in a resetting direction. Conveniently the stops are of different lengths with the smallest representing a predetermined minimum adjustment of the step length and the others being different multiples thereof, the stops 110 and 111, for example. Each stop may comprise sections clamped together about the stem 88 by means of screws and when such stops are employed it is necessary to make appropriate adjustments in the location of the cams 97 and 101 lengthwise of the support 98. The graduations of the scale 99 are each equal to the thickness of the smallest stop 110 and the support has, below that side, a series of threaded bores 112 for the screws 113 by which the cam 97 is held in place, the threaded bores 112 being spaced apart by the same distance as the graduations of the scale.

Figure 4:
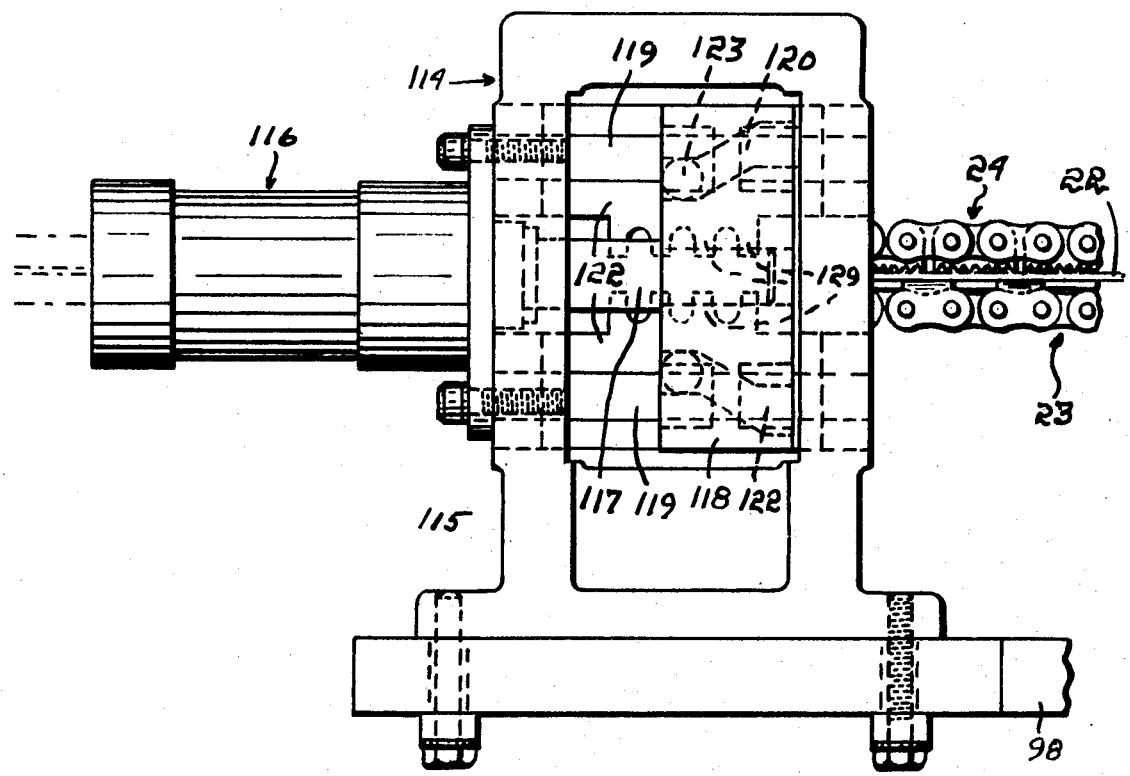
FIG. 4 is a side view, on an increase in scale, of one of the chain grabbing devices.
Figure 5:
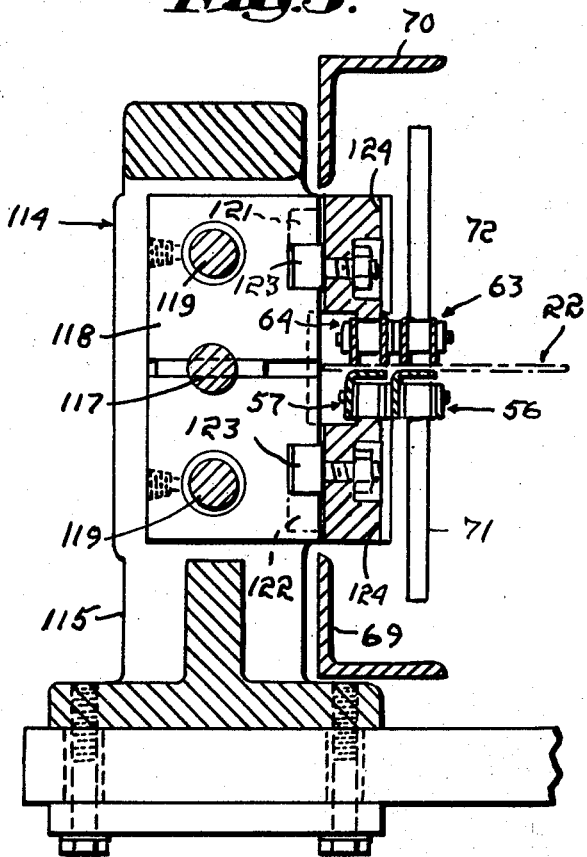
FIG. 5 is a section taken vertically through the device shown in FIG. 4.
Figure 14:
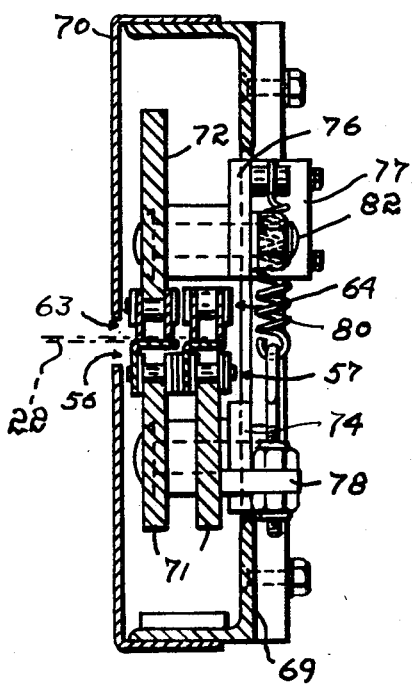
FIG. 14 is a section taken approximately along the indicated lines 14—14 of FIG. 13.

It will be noted that the support 98 is provided with chain grabbing devices generally indicated at 114, one for the chains at each side of the conveyors. The construction of the chain grabbing devices 114 is shown in FIGS. 4 and 5 with each consisting of a housing 115 to which the cylinder of a pneumatically operated piston-cylinder unit 116 is attached with its stem 117 secured to a block 118 slidably supported in the housing on vertically spaced rods 119, the block 118 having a pair of complemental cam tracks 120 and 121 in one side. Chain grabbing jaws 122 have cam followers 123 each entrant of an appropriate one of the aforesaid cam tracks. The jaws 122 are confined within a slideway 124 with which the housing 115 is provided for vertical movement between an open position in which the proximate courses of the outside chains of both conveyors are between them but free and a closed position in which said courses are grabbed. It should be here noted that throughout the maximum distance the chain grabbing devices 114 may travel, the outer shoes 71 are omitted, see FIGS. 5 and 14, so that the proximate courses of the outer chains may be received between the jaws 122. As shown in FIG. 17, the units 116 are both connected to a suitable source 125 of air under pressure by conduits 126 controlled by a valve 127 that is normally set to maintain the jaws 122 in their chain grabbing positions but is operated by a solenoid 128, see FIG. 19, to effect the movement of the jaws into their open, chain-releasing positions.

Each jaw 122 is provided with a series of teeth 129 disposed and dimensioned for entry between the rollers of the chain which it engages. It will be appreciated, that when the jaws 122 are in their operative relationship, their teeth 129 fit snugly between chain rollers to securely lock proximate courses of the outside chains to the support 98. When the piston-cylinder unit 89 is actuated to shift the support 98 in the direction of the arrow in FIG. 1 from its reset position in which the head 109 of one carriage 104 is held against the seat 86 or a stop backed thereby until it reaches the other limit of its travel in which the head 109 of the other carriage is held against the seat 87 at the other end of the frame 83. As the distance the slide 98 can travel is accurately established, the conveyors and the sheet material are also positively advanced for the exact predetermined distance. Each housing 115 is connected to the support 98 by bolts 130 extending through slots 131 extending transversely thereof to enable their position to be adjusted to vary the spacing between them as required by the adjusted width of the conveyors.

Chain locking devices, generally indicated at 132, are mounted on sprocket supports 33 for movement therewith when the width of the conveyors is varied. Each locking device 132 is located outside the conveyors and, see FIG. 8, has a mount 133 provided with a lengthwise channel 134 shown as receiving only the outer chains of the proximate courses thereof. The cylinder of a piston-cylinder unit 135 is secured to the mount 133 with it axis in the plane of the sheet 22 and at right angles to the chains. The stem 136 of the unit 135 is connected to a head 137 slidable in a bore 138 intersected by a vertical slot 139 opening through the inner end of the mount 133. The head 137 has grooves 140 receiving the ends of upper and lower bell crank levers 141 pivotally mounted in the slots 139 by pins 142. The slot 139 is interconnected by lengthwise vertical slots 143 slidably confining upper and lower locking members 144. The locking members 144 are supported by the other ends of the levers 141 so that they are movable between an inoperative position in which the outer chains are free into an operative position in which they are both locked against moving. Each locking member 144 has a series of teeth 145 which like the teeth 129 of the grabbing devices are disposed and dimensioned to fit snugly between the rollers of the chain it engages. The locking devices 132 secure the chains and accordingly the sheet material 22 against movement during dwells at which time various operations may be made on the material being conveyed. The units 135 have their conduits 146 and 147 connected to a source 53 of liquid under pressure by a four way valve 148, see FIG. 18A, set in a locking position by the solenoid 149, and in a chain releasing position by a solenoid 150, see FIG. 19.

The operation of the indexing apparatus can best be discussed in connection with the electric circuitry schematically shown in FIG. 19 in which only that part thereof that is concerned with indexing is shown.

A generally indicated circuit 151 includes a control switch 152 and has a series of parallel leads of which the lead 153 includes the normally closed switch 154 of the timer 155, a branch lead 156 and a series of switches of which the switches 157 and 158 are closed when the piston-cylinder units 26 and 27 at the article-forming station 20 are in their retracted, inoperative positions. The series also includes switches 159 and 160, closed when the piston-cylinder units 29 and 30 at the blanking station 21 are in their retracted, inoperative positions, the normally open switch 103A of the limit switch 103 closed when the support 98 is in its reset position, and the relay 162. The branch lead 156 includes the normally closed switch 163 of the relay 164 and the solenoid 150 effecting the chain-releasing positions of the locking devices 131. The lead 165 has the normally open switch 166 of the relay 162, the normally closed switch 167 of the relay 164 and the relay 162.

It will thus be apparent that if the operations at the stations have been completed, the time controlled dwell terminated and the support 98 in its reset position, the circuit to the timer 155 is open as will presently be described, the lead 153 is closed to energize the relay 162 with its switch 166 now closed so that the lead 165 serves as a holding circuit therefor.

The lead 167 has parallel leads 168 and 169 with the branch lead 168 having the normally open switch 170 of the relay 162 and the solenoid 93 by which the valve 92 is set to cause indexing. The lead 169 is provided with the normally closed switch 171 of the relay 162 and the solenoid 94 by which the valve 92 is shifted to effect resetting of the support 98.

Assuming that the operations at the stations have been completed with the switches 157, 158, 159, and 160 closed and the support 98 in its reset position so that the switch 161 is also closed, the relay 162 is energized. As a consequence, the relay switch 103 is now closed with the solenoid 93 energized and the relay switch 171 is open. The normal status of the grabbing device 114 is that the jaws 122 are in their closed, chain grabbing positions. The support 98 now moves forwardly carrying the conveyor chains with it until its other limit of travel is reached.

The lead 172 has the limit switch 102 closed when the support 98 reaches said other limit of travel and the relay 164 which is now operable to open the switch 167 in the holding circuit for the relay 162. The lead 174 has the normally open switch 175 of the relay 164 and the timer 155 so that with the relay 164 energized, the switch 175 closes and the timer 155 is started and the switch 154 is then opened. An important feature of the invention is that the switch 167 is of the type having a brief predetermined time delay before it opens. When the relay 164 is energized, the switch 163 is instantly opened while the relay 162 is held energized for a brief interval delaying resulting reset travel of the support 98.

The lead 176 has the normally open timer switch 177 and the normally closed switch 103B of the limit switch 103 cammed open by the cam 101 when the support 98 reaches its reset position, and the parallel leads 179, 180, and 181. The lead 179 includes the solenoid 149 which is energized to lock the chains against movement, such locking occurring before the resetting of the indexing means because of the time delay feature of the switch 167. The lead 180 includes the solenoid 128 which is now energized to cause the grabbing devices to release the chains. The lead 180 includes a relay 182 operable to close its normally open switch 183 in the holding lead 184. The lead 185 includes the normally open switch 186 of the timer 155 thus to serve as a holding circuit therefor and for the relay 187 in parallel with the timer 155 and controlling other circuitry to enable operations at other stations to be performed during a dwell. Thus, at the end of a step, the grabbing devices 114 are released and the locking devices 132 energized to lock the chains, and the support 98 then returned to its reset position.

At the end of the resulting reset travel of the support 98, the cam 101 on the support 98 again closes the limit switch 103A but the solenoid 162 cannot be again energized until the end of the timed dwell and the other limit switches in the lead 153 are closed. At the end of the dwell, the chain locking device 132 releases the chains.

Reference is now made to the utility of the valve 95. It will be seen from FIGS. 3 and 6 that as the end of the reset travel of the support 98 nears, the cam 97 moves the valve 95 to partially close it thus to decelerate the support 98 and to provide that at the commencement of the next step, its indexing travel will be accelerated after an initial relatively slow start thus protecting the conveyor chains against stretching. It is also desirable to provide like deceleration of the support as the end of an indexing step is reached. This result is attained by means of a cam 97A so located, see FIG. 3, as to operate the valve 95 in the manner of the cam 97 as the end of a step is approached.

From the foregoing, it will be apparent that indexing apparatus in accordance with the invention are well adapted to meet the requirements of ensuring precision steps with misalignment of the chain links prevented by constant, equalized tensioning of the conveyors, and with the acceleration and deceleration of the support 98 provided in both directions of its travel.

We claim:

1. Indexing apparatus comprising conveying means, a base, a support connected to said base for movement between two limits defining a step and including means to grab said conveying means, means operable to reciprocate said support between said limits to effect travel of said grabbing means lengthwise of the conveying means, means operable to render said grabbing means effective during travel thereof from one limit to the other in one direction thereby to effect a stepped advance of said conveyor, means to lock the conveying means against travelling, and control means to effect the operation of the reciprocating means when it reaches either limit and of the locking means during travel of the support in its resetting direction, said control means including a timer operable when the support is at the end of a step to provide a predetermined delay before another advancing step results from its resetting travel.

2. The indexing apparatus of claim 1 in which the timer is set in operation at the end of each step and provides an operating cycle in which first the locking means are rendered operative, the reciprocating means are then operated in the support resetting direction, and finally the reciprocating means operated to advance the support for another step.

3. The indexing apparatus of claim 2 in which the grabbing means is normally operative and the control means renders the grabbing means inoperative during resetting travel of the support.

4. The indexing apparatus of claim 1 in which the base includes means to lock the conveying means, timer-controlled means to render said locking means operative on travel of the grabbing means in the other direction and to provide a dwell, adjustable means to vary the infeed limit relative to the outfeed limit, and adjustable means operable to vary the operation of the grabbing and the release of the locking means in relation to the adjusted infeed limit.

5. The indexing apparatus of claim 1 in which the base includes lengthwise tracks and the means connecting the support to the base include marginal rollers in engagement with the tracks.

6. The indexing apparatus of claim 1 in which there is a lower pair of tracks that are both outwardly and upwardly inclined and an upper pair of tracks that are both inwardly and upwardly inclined and the axes of the rollers are inclined as required by the engaged track.

7. The indexing apparatus of claim 1 and stops attachable to the stem of the piston-cylinder unit to be then backed by the proximate seat, one stop being of a predetermined axial extent and the axial extent on another stop being a multiple thereof.

8. The indexing apparatus of claim 7 and conduits for liquid under pressure in communication with opposite ends of the cylinder of the unit and including a four-way valve, a pair of solenoids connected to said valve, one operable to set said valve to effect indexing travel of the support and the other operable to effect resetting travel thereof, limit switches mounted on the base, one for each solenoid and in control thereof, and cams one adjacent each end of the support and attached thereto and operable to engage and actuate the appropriate one of said limit switches at the end of support travel in a predetermined direction.

9. The indexing apparatus of claim 8 and means to adjust the travel of the support relative to its reset position, and means to adjust the position of the cam actuating the limit switch at the end of reset travel of the support lengthwise thereof by increments equal to the maximum axial extent of a stop.

10. The indexing apparatus of claim 9 and a regulating valve in control of one of the conduits, and a cam associated with the cam operable at the end of reset travel of the support and adjustable therewith, said associated cam being operable to actuate the regulating valve to decelerate the rate of support travel as the support arrives at and leaves its reset position.

11. The indexing apparatus of claim 10 and a cam associated with the cam operable at the end of the indexing travel of the support and operable to actuate the regulating valve to decelerate and accelerate the rate of support travel as the support arrives at and leaves the seat at the outfeed end of the conveyor means.

12. The indexing apparatus of claim 1 in which the control means effects locking engagement of the grabbing means with the conveying means only from the time when the support is in its reset position until it has completed a step and the control means is operable to render the locking means operable to hold the conveying means when the support is in its reset position but before the resetting travel of the support is initiated and to continue operable until the end of the timed interval.

13. The indexing apparatus of claim 1 in which the reciprocating means includes a double-acting, piston-cylinder unit, a source of liquid under pressure, and a valve including a control movable between positions effecting low and high speed travel of the support, and means carried by said support to actuate said control from its high speed position to its low speed position from the time it approaches its reset position until after it has left that position to effect another step.

14. The indexing apparatus of claim 13 in which the support also includes means to actuate the control from its high speed position to its low speed position from the time it approaches the end of a step until after it has left that position towards its reset position.

15. Indexing apparatus comprising a base, conveying means mounted on said base and including supporting and hold-down conveyors, both including endless, transversely spaced chains with their proximate courses disposed to receive sheet material between them, each one of the conveyors including endless outer chains at each side, sprockets in support of all chains of each conveyor, the sprockets for the additional chains being axially connected to the corresponding sprockets of the appropriate one of the conveyors, a support connected to said base for movement between two limits defining a step and including a grabbing device at each side of the conveyor means and operable to grab together the proximate courses of the additional chains at that side, means operable to reciprocate said support between said limits to effect travel of said grabbing means lengthwise of the conveying means, means operable to render said grabbing means effective during travel of said support from one limit to the other in one direction thereby to effect a stepped advance of said conveying means and means operable to lock said additional chains to said base during resetting travel of the support.

16. The indexing apparatus of claim 15 in which each grabbing device comprises a mount having a vertical slideway extending lengthwise of the conveying means, a pair of jaws in said slideway, each jaw including a cam follower, and fluid pressure operated means attached to said mount and provided with a head reciprocable therein, the head having a pair of cam tracks, each receiving a cam follower and inclined towards each other, whereby on reciprocation of said head, the jaws are moved into and out of a closed position, each device being disposed with the proximate courses of the appropriate additional chains between the jaws.

17. The indexing apparatus of claim 16 in which the jaws include a plurality of teeth disposed towards each other and shaped and dimensioned to fit snugly between rollers of the additional chains.

18. The indexing apparatus of claim 15 and fluid pressure operated means operable to lock the additional chains against movement at least while the support is travelling in a resetting direction, the locking means comprises a pair of locking devices, one at each side of the conveying means, each device comprising a mount, a piston-cylinder unit attached to said mount with its axis at right angles to the direction of travel of the conveying means, a pair of jaws, one below and one above the proximate courses of the additional chains, bell cranks each pivotally supported by said mount with one end connected to the stem of said unit and with its other end in support of an appropriate one of the holders.

19. The indexing apparatus of claim 18 in which each jaw has a series of teeth disposed and dimensioned for snug entry between the rollers of the additional chains.

20. The indexing apparatus of claim 15 and conveyor tensioning means connected to both conveyors and operable to maintain an equalized tension thereon.

21. The indexing apparatus of claim 15 and shoes supporting the upper courses of the chains of the supporting conveyor and shoes yieldably urging the lower courses of the chains of the hold-down conveyor downwardly into gripping relation with the subjacent conveyor chains, and shoes supporting the upper courses of the additional chains except in the zone of travel of the grabbing devices.

* * * * *